US008867922B2

(12) United States Patent
Nakajima (10) Patent No.: US 8,867,922 B2
(45) Date of Patent: Oct. 21, 2014

(54) CONTROL DEVICE OF NODE TRANSFERRING SIGNAL LIGHT

(75) Inventor: Ichiro Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1613 days.

(21) Appl. No.: 12/149,101

(22) Filed: Apr. 25, 2008

(65) Prior Publication Data

US 2010/0028008 A1    Feb. 4, 2010

(30) Foreign Application Priority Data

Apr. 27, 2007   (JP) ................................ 2007-119068

(51) Int. Cl.
*H04B 10/00*   (2013.01)
*H04J 14/02*   (2006.01)
*H04B 10/079*   (2013.01)
*H04B 10/08*   (2006.01)

(52) U.S. Cl.
CPC ...... *H04B 10/07955* (2013.01); *H04J 14/0221* (2013.01); *H04J 14/0283* (2013.01); *H04J 14/0213* (2013.01); *H04J 14/0212* (2013.01)
USPC ............................................ 398/177; 398/33

(58) Field of Classification Search
USPC ...................... 398/173–181, 25, 37
See application file for complete search history.

(56) References Cited

U.S. PATENT DOCUMENTS

| 7,181,137 B1 * | 2/2007 | Tamburello et al. ............ 398/20 |
| 2003/0099475 A1 | 5/2003 | Nemoto et al. | |
| 2006/0285846 A1 * | 12/2006 | Uekama et al. ................. 398/30 |
| 2007/0098411 A1 * | 5/2007 | Ghera et al. .................. 398/177 |

FOREIGN PATENT DOCUMENTS

| JP | 8-15012 | 1/1996 |
| JP | 11-186962 | 7/1999 |
| JP | 2003-163641 | 6/2003 |

OTHER PUBLICATIONS

Japanese Office Action issued Aug. 30, 2011 in corresponding Japanese Patent Application No. 2007-119068 (2 pages) (3 pages English Translation).

* cited by examiner

*Primary Examiner* — Daniel Dobson
(74) *Attorney, Agent, or Firm* — Staas & Halsey LLP (57) ABSTRACT

To provide a technology of preventing an optical signal from being mistakenly recognized as an optical noise even when a surge occurs. A control device of a node that transfers signal light monitors inputted light, determines, when power of the inputted light reaches a saturation level of a monitor unit as a result of monitoring, that the inputted light is signal light, further determines based on a spectral line shape of the inputted light, when the power thereof does not reach the saturation level, whether the inputted light is the signal light or ASE light; and stops a transfer of the ASE light if determined to be the ASE light.

7 Claims, 12 Drawing Sheets

FIG. 1

RELATED ART

OPTICAL POWER DETECTED BY ELEMENT

FIG. 6B

APPROXIMATE WAVEFORM

CONTROL DEVICE OF NODE TRANSFERRING SIGNAL LIGHT

This application claims the benefit of Japanese Patent Application No. 2007-119068 filed on Apr. 27, 2007 in the Japanese Patent Office, the disclosure of which is herein incorporated in its entirety by reference.

BACKGROUND

The present invention relates to a technology of monitoring an optical signal in an optical transmission network.

With an increase in communication traffic, optical networks based on a wavelength multiplexing technology have increasingly been built up in a long-haul region, a metro region and an access region, respectively.

In the optical transmission network, Optical Add/Drop Multiplexer (OADM) equipment capable of relaying (Through), transmitting (Add) or terminating (Drop) signals on a wavelength basis of the light is required for building up a more flexible network.

The OADM equipment, a terminal station device and a relay device monitor WDM (Wavelength Division Multiplexing) signals and make a level adjustment of each of the wavelengths in order to transmit the signals at a long distance.

Figure 1:
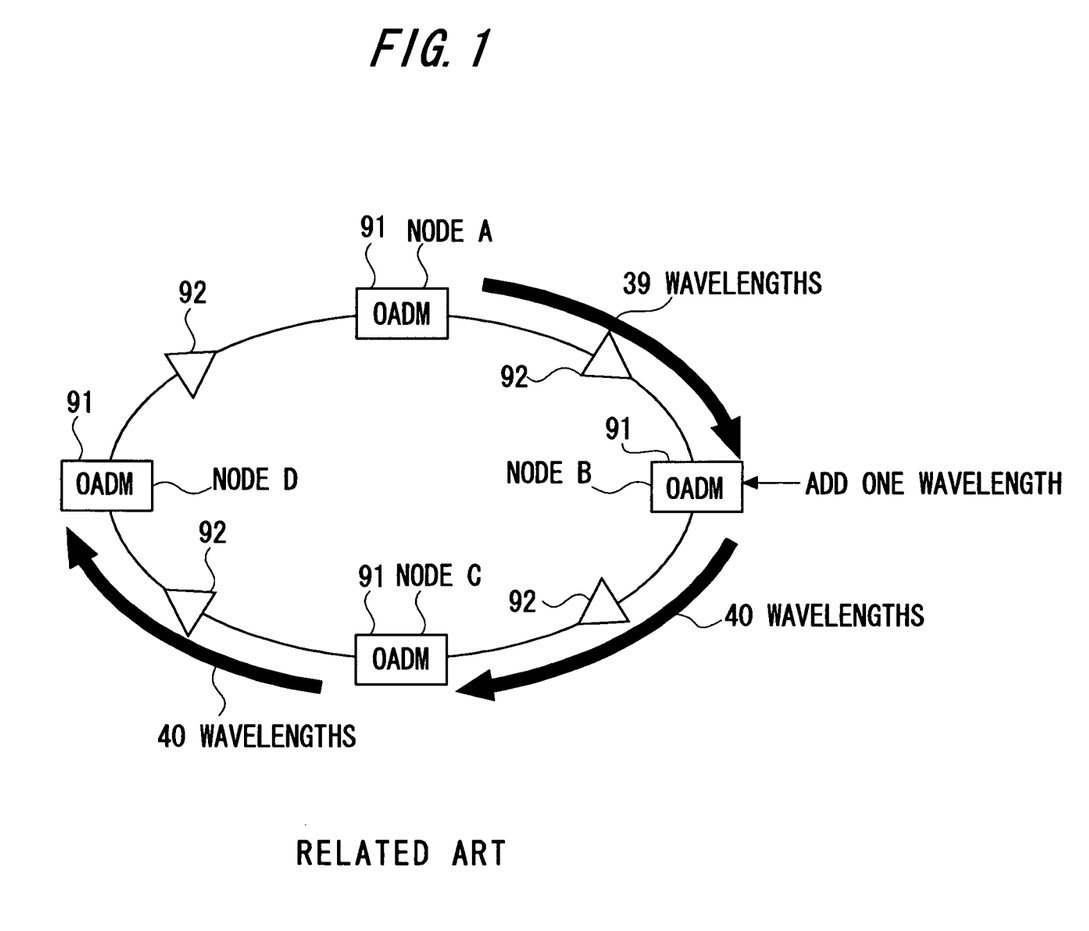
FIG. 1 is a schematic view of a conventional ring network.

FIG. 1 shows an example of a ring network using the OADMs.

OADM equipment 91, to which the WDM signals are inputted, can drop, add and through let a desired wavelength of the WDM signals.

For example, in the case of dropping the signal, the OADM equipment 91 demultiplexes the signal branched off by an optical coupler and optically receives a desired channel (wavelength). Further, the OADM equipment 91 demultiplexes (DEMUX) (demultiplexing of wavelengths) the WDM signals according to the wavelengths, and inputs the demultiplexed signals to one input of an optical switch. Then, the OADM equipment 91 inputs an add signal to the other input of the optical switch. Subsequently, the OADM equipment 91 outputs the signal selectively on a wavelength-by-wavelength basis by transmitting the signal to a next OADM equipment in a way that lets a through-signal or the add signal through the optical switch.

Then, after passing through a Variable Optical Attenuator (VOA), the MUX (multiplexer) multiplexes the wavelengths of the signals of individual channels, and the thus-multiplexed signals are transferred as WDM signals to a posterior node. At this time, the OADM equipment 91 monitors the wavelength-multiplexed signals with an optical channel monitor (OCM), and controls the VOA so that each wavelength comes to a target level.

Moreover, optical amplifiers 92 are properly provided at anterior-and-posterior stages of the OADM equipment 91, thus scheming to elongate a transmission distance by compensating a loss of the optical level of the signal between the OADM equipments 91 and an insertion loss of optical components of the OADM equipment 91.

Further, in the network RN where the arbitrary OADM equipment 91 thus adds/drops the signal light, the signals transmitted through within the network dynamically change in terms of the number of wavelengths, and hence the optical amplifier 92 performs gain constant control (Automatic Gain Control (AGC)) to retain output optical power of each wavelength at a fixed level with respect to fluctuations in the wavelengths.

Therefore, when the WDM signals pass through the optical amplifiers 92 at several stages, optical noises based on Amplified Spontaneous Emission light (ASE light) are accumulated at unused channels, which might affect the gain control in the optical amplifier 92.

Such being the case, in the OADM equipment 91 and in the variable optical attenuator (VOA) within a terminal station device, an Optical Channel Monitor (OCM) monitors each channel (wavelength), and, if the monitored light is not the signal light but the ASE light, the VOA on a channel basis shuts down (increases an attenuation quantity), thus conducting the control so as not to transmit the ASE light to a downlink node.

Figure 2:
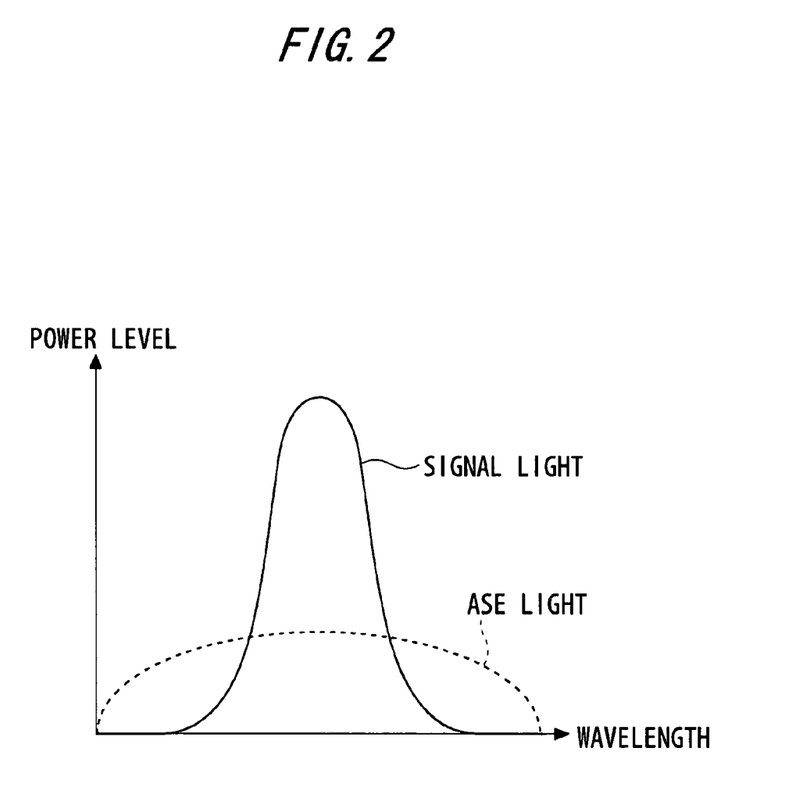
FIG. 2 is a diagram showing spectral line shape of signal light and of ASE light.

At this time, it is determined based on a difference between spectral line shapes whether the monitored light is the signal light or the ASE light. For example, as illustrated in FIG. 2, if being the signal light, the signal light takes a shape having a peak that is narrow in width and large in height at a specified frequency, and, whereas if being the ASE light, the ASE light takes a shape having the same large width as a transmission bandwidth of a filter device.

Moreover, a technology disclosed in, e.g., the following Patent document 1 is given as the prior art related to the invention of the present application.

[Patent document 1] Japanese Patent Laid-Open Publication No. 8-15012

SUMMARY

In the wavelength multiplexing optical transmission network, if fast fluctuations in the number of wavelengths are caused due to a fracture of an optical fiber, a surge (fluctuation in optical level) occurs in some cases. For example, as shown in FIG. 1, when transmitting 39 wavelengths from a node A and one wavelength from a node B clockwise (in the sequence of the nodes A, B, C and D) and if a fault occurs between the node A and the node B, the number of the wavelengths to be transmitted abruptly fluctuates from 40 wavelengths down to one wavelength (ch 1) between the node B and the node D. This implies that the optical level of the light to be transmitted becomes approximately 1/40.

In this case, the power level of ch 1 gets larger than a normal level due to SRS (Stimulated Raman Scattering) and a WDL (Wavelength Dependent Loss) on the transmission path, resulting in the occurrence of the surge.

Figure 3:
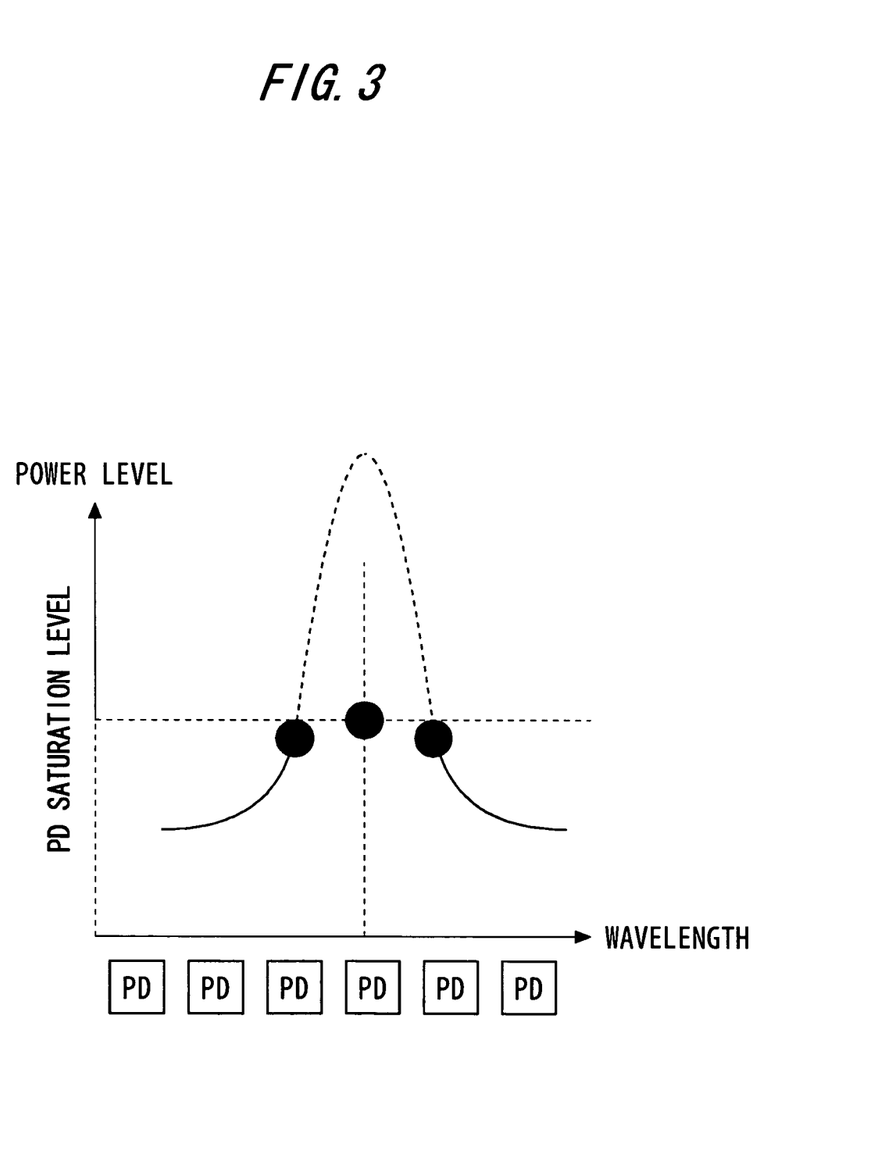
FIG. 3 is a diagram showing a state where a light receiving element gets saturated.

Namely, the optical power larger than the normal level is inputted to the optical channel monitor within each node due to the occurrence of the surge. Herein, it is considered that the optical channel monitor takes a configuration in which light receiving elements, e.g., PDs (photodiodes) are arranged according to the respective wavelengths of spectrums of the dispersed light. Then, when the surge occurs, the signal light having the larger optical power than the normal level is inputted, and, if over a saturation level of the PDs of the channel monitor, as illustrated in FIG. 3, a sharp area (encircled by a dotted line) of the spectral line shape is ignored, resulting in such a problem that the signal light is mistakenly recognized as the ASE light because of taking a shape similar to the transmission bandwidth of the filter device due to a decreased monitor level difference between the neighboring PDs that detect neighboring wavelengths.

Namely, there exists a possibility in which the signal light is mistakenly recognized as the ASE light when a signal causing the PD to get saturated is inputted and the shut-down occurs.

Such being the case, one aspect of embodiments provides a technology of preventing the optical signal from being mistakenly recognized as an optical noise even when the surge occurs.

One aspect of an embodiment adopts the following configurations in order to solve the problems given above.

Namely, according to one aspect of embodiments, a control device of a node that transfers signal light, comprises:

a monitor unit monitoring inputted light;

a determining unit determining, when power of the inputted light reaches a saturation level of the monitor unit as a result of monitoring, that the inputted light is signal light, and determining based on a spectral line shape of the inputted light, when the power thereof does not reach the saturation level, whether the inputted light is the signal light or ASE light; and a stopping unit stopping a transfer of the ASE light if determined to be the ASE light.

Moreover, a node according to another aspect of embodiments comprises: a transfer unit transferring signal light via a network; and a control device controlling the transfer of the signal light by the transfer unit.

The monitor unit may include a light receiving element array having a plurality of light receiving elements, and a demultiplexing unit demultiplexing the inputted light according to wavelengths and leading the demultiplexed light to the light receiving elements corresponding to the wavelengths.

If the inputted light is composed of signal light of a plurality of channels having different wavelengths, the determining unit may make the determination in a way that excludes detected results of the light receiving elements corresponding to predetermined wavelengths that are embraced by boundaries between the different channels.

The control device may further comprise an adjusting unit adjusting, when the determining unit determines that the inputted light is the signal light, the signal light to a predetermined level of power.

Further, a control method executed by a control device of a node that transfers signal light, comprises:

a step of monitoring inputted light;

a step of determining, when power of the inputted light reaches a saturation level of the monitor unit as a result of monitoring, that the inputted light is signal light, and determining based on a spectral line shape of the inputted light, when the power thereof does not reach the saturation level, whether the inputted light is the signal light or ASE light; and a step of stopping a transfer of the ASE light if determined to be the ASE light.

According to one aspect of embodiments, it is feasible to provide the technology of preventing the optical signal from being mistakenly recognized as the optical noise even when the surge occurs.

DETAILED DESCRIPTION OF THE INVENTION

First Embodiment

A best mode for carrying out the present invention will hereinafter be described with reference to the drawings. Configurations in the following embodiments are exemplifications, and the present invention is not limited to the configurations in the embodiments.

Figure 4:
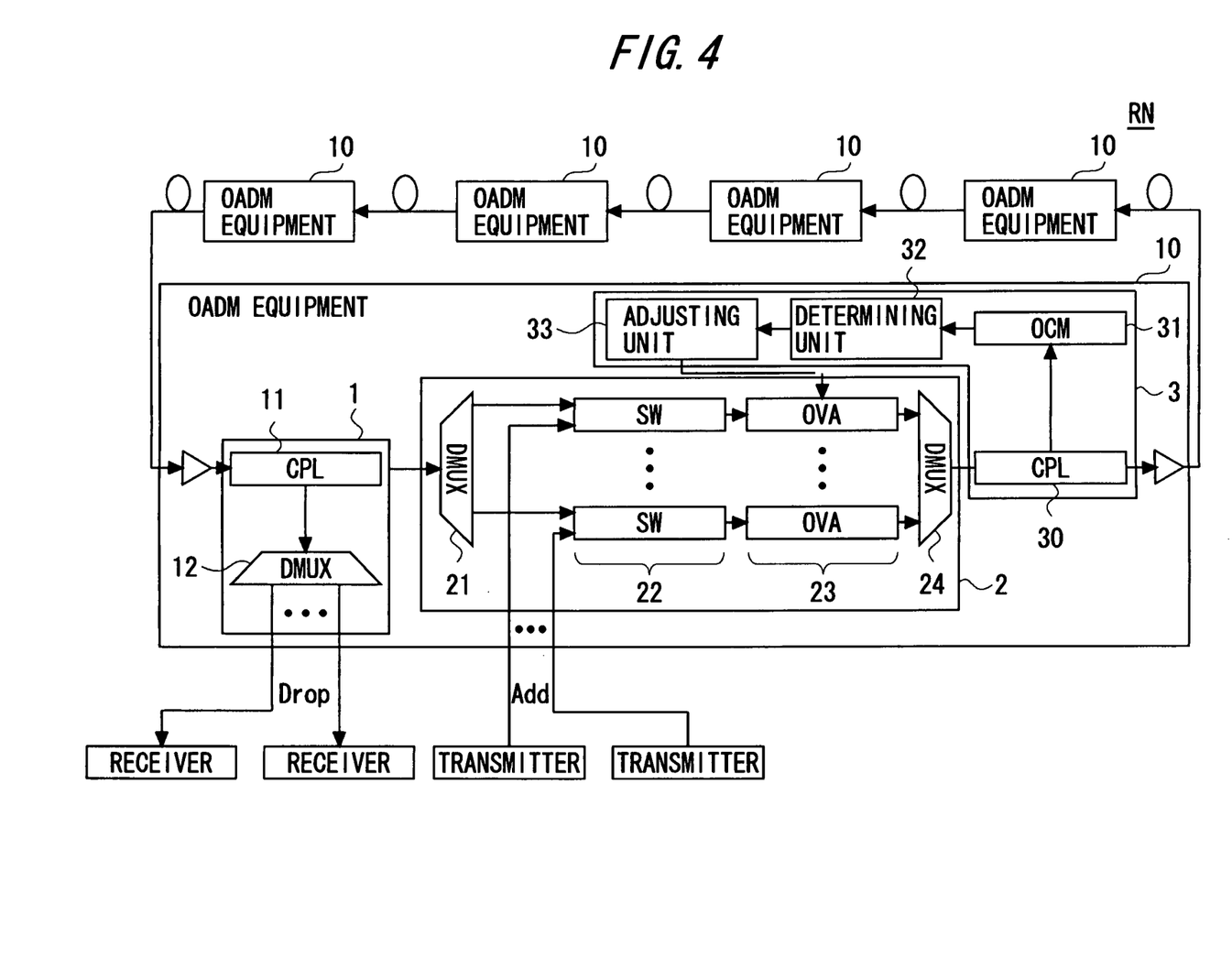
FIG. 4 is a diagram illustrating a communication system according to the embodiment.

FIG. 4 is a diagram schematically showing a configuration of a node according the embodiment.

In the first embodiment, a plurality of nodes 10 builds up a ring topology network (communication system) RN, in which each node 10 monitors a WDM (Wavelength Division Multiplexing) signal (signal light), then makes a level adjustment of each wavelength, and thus transmits the WDM signal to a posterior node. The embodiment is not limited to the ring topology but can be applied to a point-to-point network and to a mesh network. Namely, the embodiment can be applied to not only the add/drop multiplexer (ADM) but also a terminal device (Terminal), a relay device (Inline Amplifier: ILA), an optical amplifying device, etc.

As illustrated in FIG. 4, the node (OADM device) 10 includes a drop unit 1, a wavelength selecting block (through/add unit) 2, a control device 3, etc.

In the drop unit 1, a branching unit (Optical Coupler (CPL)) 11 branches (drops) inputted light (optical signals) transmitted from an anterior node, a demultiplexing unit (DMUX) 12 demultiplexes the optical signals, and a receiver receives the signals.

The wavelength selecting block 2 includes a demultiplexing unit (separating unit) 21 that demultiplexes (separates) the WDM signal into signals of respective channels, a switch 22 for selecting the signal that is let-through/added, a VOA 23 that adjusts a signal output level of each channel, and a MUX 24 that multiplexes the signals of the respective signals into the WDM signal by multiplexing the wavelengths thereof.

The control device 3 controls the individual units within the node. Especially in the first embodiment, the control device 3 monitors the WDM signal (inputted light) from the wavelength selecting block 2, and sets the signal light of each channel at a predetermined level or shuts down ASE (Amplified Spontaneous Emission) light by controlling the VOA 23 of the wavelength selecting block 2.

The control device 3 includes a branching unit (optical coupler: CPL) 30, a monitor unit 31, a determining unit 32 and an adjusting unit (stopping unit) 33.

The branching unit 30 branches (drops) a part of the WDM signals from the wavelength selecting block 2 and leads the signals to the monitor unit 31.

The monitor unit 31 monitors the WDM signals (inputted light) and detects power and a spectral line shape of the signal light of each of the channels of the WDM signals.

Figure 5:
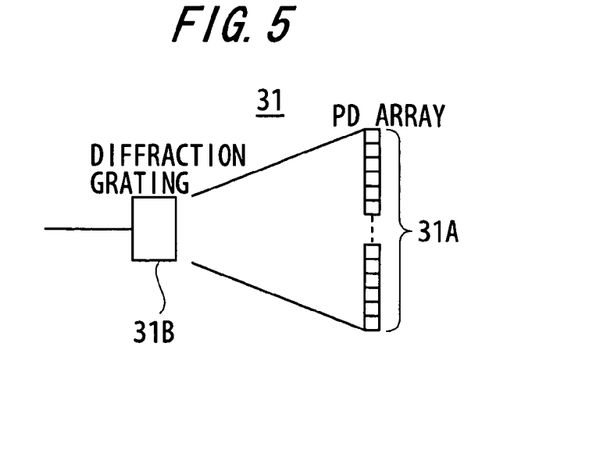
FIG. 5 is a schematic diagram of a monitor unit.

The monitor unit 31 in the first embodiment includes, as shown in FIG. 5, a light receiving element array 31A in which a plurality of light receiving elements (e.g., photo detectors (PDs)) is one-dimensionally arrayed, and a demultiplexing unit 31B that demultiplexes (disperses) the inputted light into spectrums according to the wavelengths and leads the spectrums of the light to the light receiving elements corresponding to the respective wavelengths. Namely, the demultiplexing unit 31B disperses the inputted light into the spectrums spatially arranged from the shortest wavelength up to the longest wavelength, and the individual light receiving elements are arrayed corresponding to the arrangement of the spectrums from the shortest wavelength up to the longest wavelength. Note that a diffraction grating and an AWG (Arrayed Waveguide Grating) can be applied to the demultiplexing unit 31B.

Figure 6A:
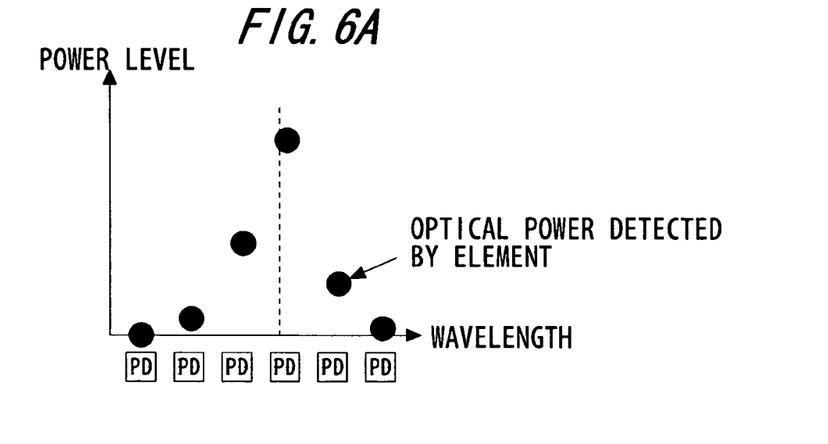
FIG. 6A is a diagram showing a detected result of the light receiving element.
Figure 6B:
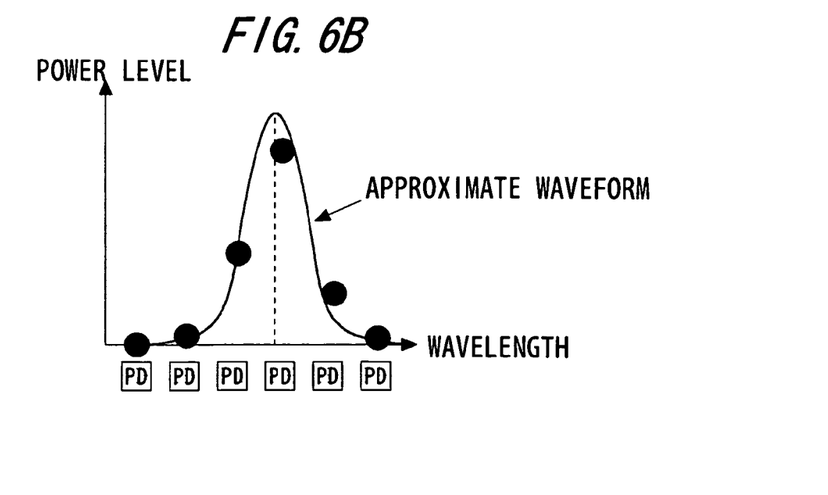
FIG. 6B is an explanatory diagram showing approximation of the spectral line shape.

Each of the light receiving elements outputs (photo-electrically converts) a signal value corresponding (proportional) to a light receiving quantity. Accordingly, positions of the individual light receiving elements, i.e., the wavelengths and optical power according to the wavelengths are acquired (FIG. 6A), and a spectral line shape can be, as illustrated in FIG. 6B, acquired by performing approximate calculations based on the wavelengths and the optical power. Herein, the light receiving elements are, when receiving the normal signal light, designed to obtain the signal values proportional to the light receiving quantities as in a rectilinear area 51 shown in FIG. 7.

Figure 7:
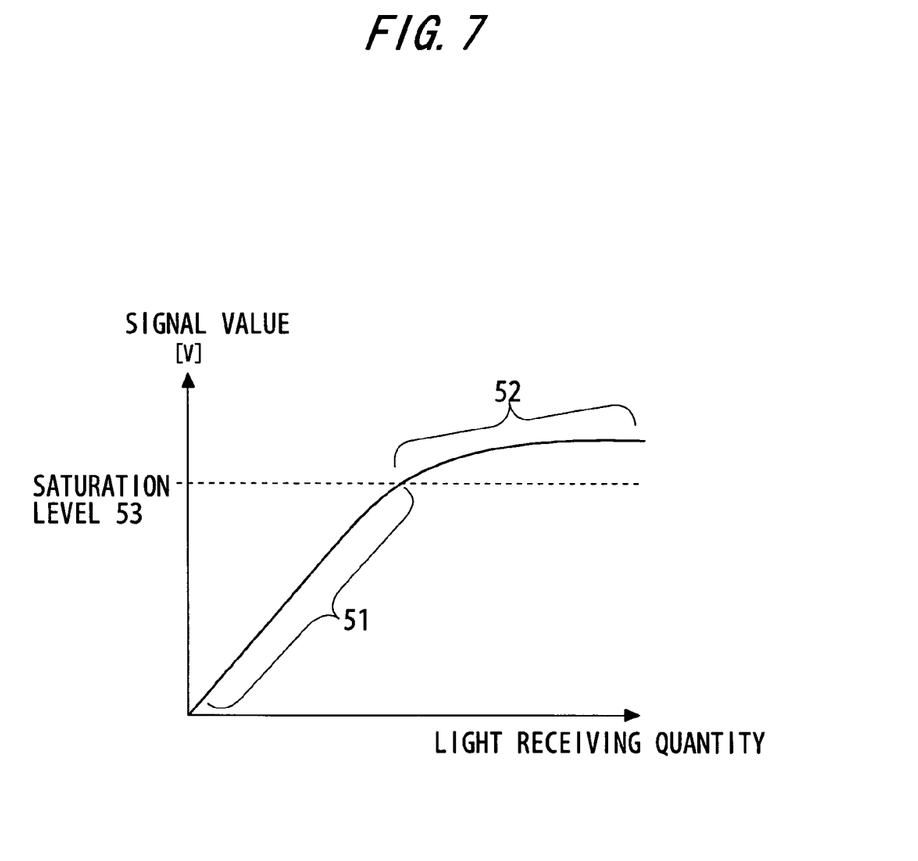
FIG. 7 is an explanatory diagram of a saturation level.

If the light receiving quantity excessively becomes large due to occurrence of a surge, however, as in a saturation area 52 shown in FIG. 7, the signal value does not change even when the light receiving quantity rises. A level, at which the linearity of the output relation between the light receiving quantity and the signal value is lost, is previously defined as a saturation level 53, and, as will be described later on, if the signal value output from the light receiving element is equal to or larger than the saturation level 53, it is judged that the light receiving elements get saturated, i.e., the signal light reaches the saturation level of the light receiving elements (the monitor unit 31).

The determining unit 32, as a result of monitoring, if the inputted light reaches the saturation level of the monitor unit 31, determines the inputted light to be the signal light, and, whereas if the inputted light does not reach the saturation level, determines based on the spectral line shape of the inputted light whether the inputted light is the signal light or the ASE light.

The adjusting unit 33 adjusts the output of the signal light per channel by controlling the VOA. The adjusting unit in the first embodiment serves as a stopping unit that stops (shuts down), when the monitored channel light is determined to be the ASE light, the transfer of the ASE light by conducting the control so as to increase an attenuation quantity of the VOA.

Given hereinafter is an explanation of a control method of shutting down the ASE light by monitoring the WDM signals in OADM equipment 10 having such a configuration.

Figure 8:
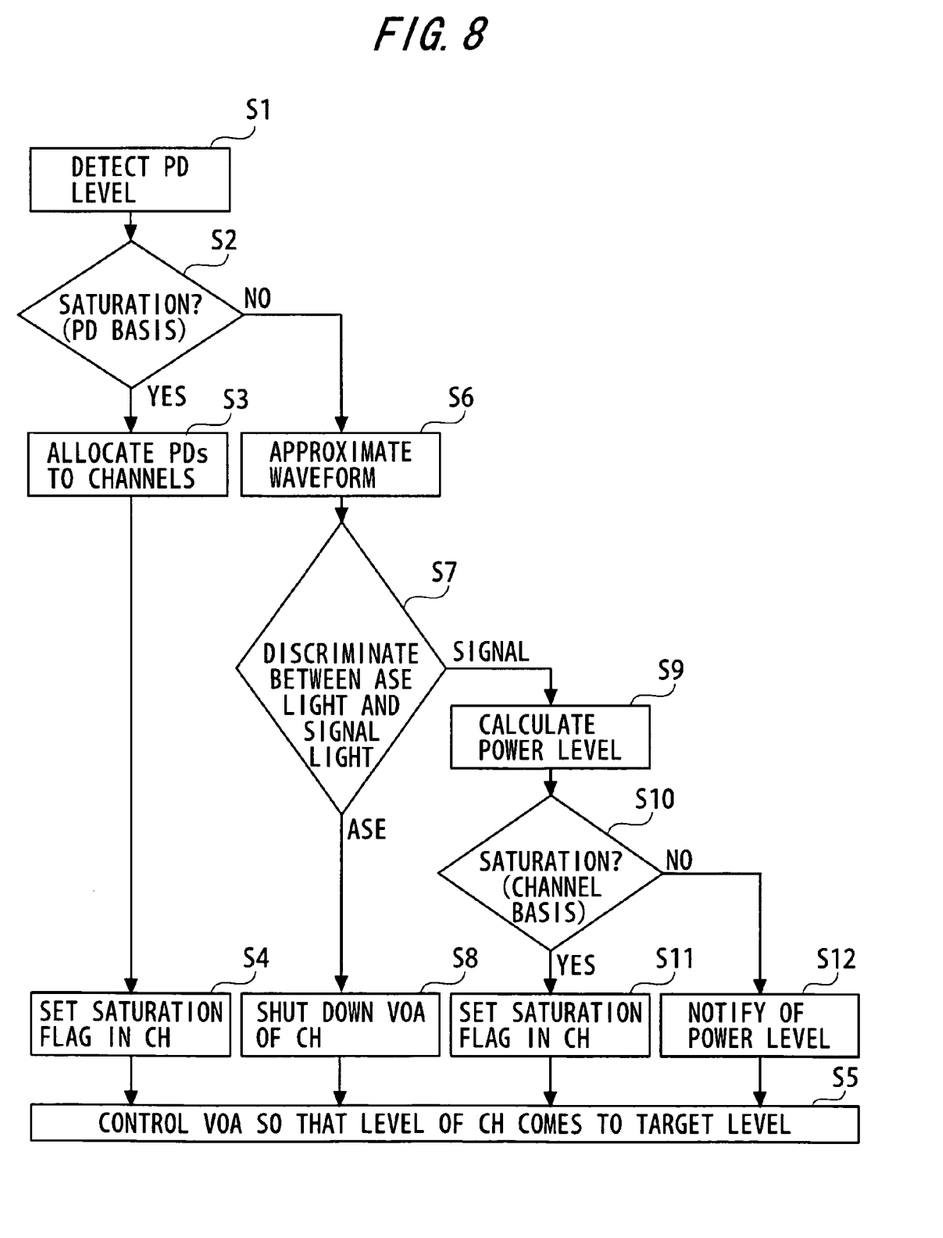
FIG. 8 is an explanatory diagram showing a control method.

FIG. 8 is an explanatory diagram of the control method.

To start with, the optical coupler (CPL) 30 branches the WDM signals from the wavelength selecting block 2, the demultiplexing unit 31B of the monitor unit 31 spatially demultiplexes the WDM signals corresponding to the frequencies, and each of the light receiving elements of the light receiving element array 31A detects the optical power of the demultiplexed light (step 1, which will hereinafter be abbreviated such as S1).

Figure 9:
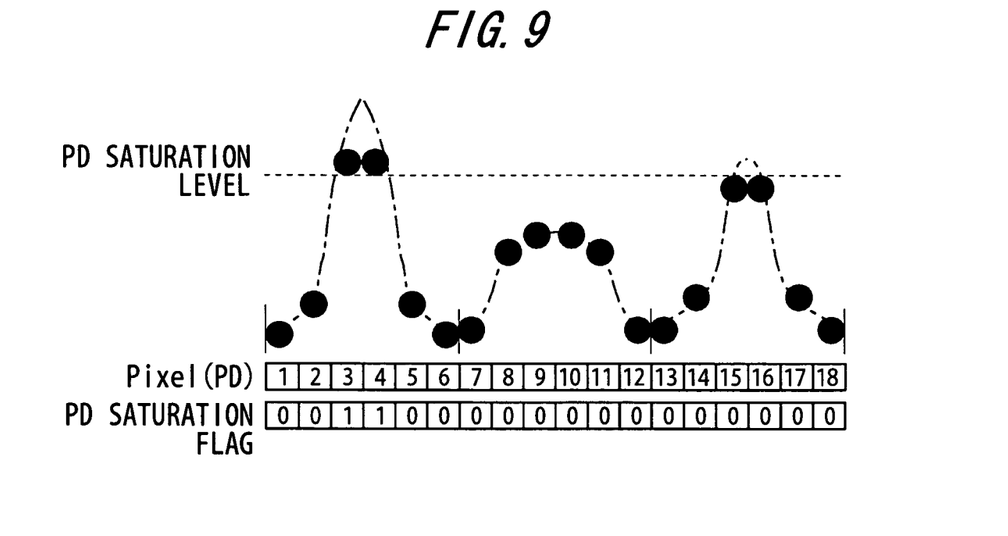
FIG. 9 is an explanatory diagram showing saturation determination.

Next, it is determined whether the optical power detected by each light receiving element reaches the saturation level or not, and, when reaching the saturation level, a PD (photodiode) saturation flag corresponding to the very light receiving element is set up. For example, as shown in FIG. 9, a bit representing the light receiving element that does not reach the saturation level is set to "0", while a bit representing the light receiving element that reaches the saturation level is set to "1" (S2). Note that a storage element having bits of which a bit count corresponds to the number of, e.g., the PDs (photodiodes) constituting a PD array can be used for executing this process.

Figure 10:
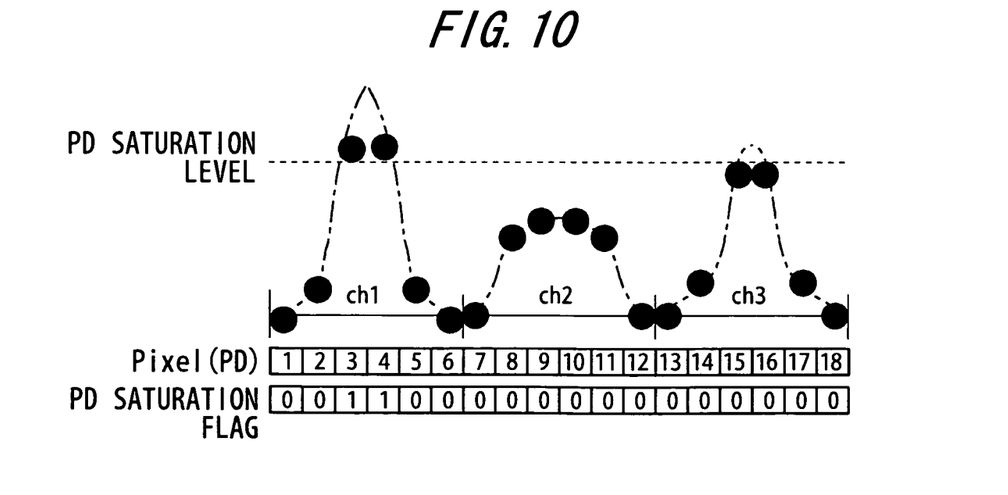
FIG. 10 is an explanatory diagram showing the saturation determination.

When there exist the light receiving elements that reach the saturation level, these light receiving elements are allocated to the individual channels. FIG. 10 shows that the light receiving elements located in a first position through a sixth position are allocated to 1-channel, the light receiving elements located in a seventh position through a twelfth position are allocated to 2-channel, the light receiving elements located in a thirteenth position through an eighteenth position are allocated to 3-channel, and so on (S3).

The channel allocation is done such that an associative relation between the positions (order) of the light receiving elements and the channels is previously determined corresponding to frequency intervals of the individual channels and is organized into a table, and the channel allocation is fixedly made based on which light receiving element the signal comes from by reading the table when receiving the light. Further, a boundary area 54 between the respective signals is obtained from the spectral line shape of the optically-received signals, and the channel allocation may also be dynamically changed.

Figure 11:
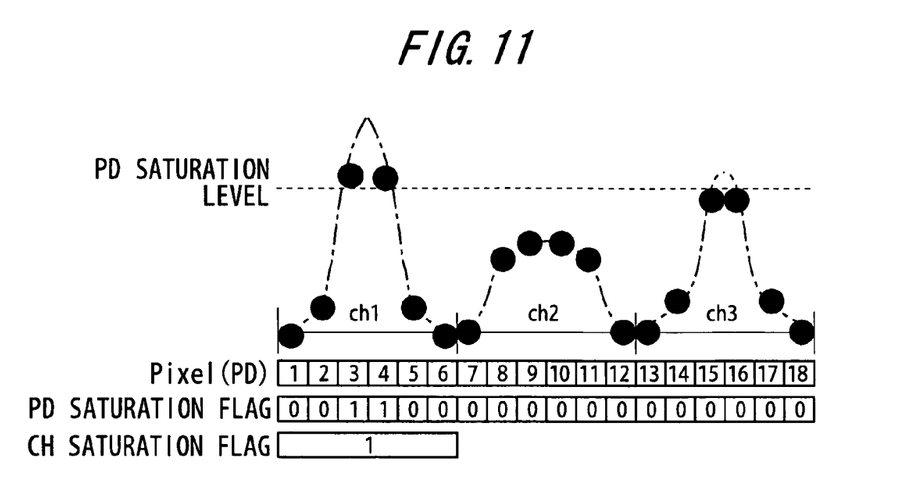
FIG. 11 is an explanatory diagram showing the saturation determination.

Then, the PD saturation flag is referred to, and, as illustrated in FIG. 11, a ch saturation flag is set up at the channel to which the saturated light receiving element belongs (S4). Namely, the channel embracing any one of the saturated light receiving elements is deemed to be saturated.

The adjusting unit 33 attenuates the signal light by controlling the VOA in order to set the saturated channel at a target level, corresponding to the ch saturation flag (S5).

On the other hand, with respect to the light receiving elements determined not to reach the saturation level, the determining unit 32 approximates the spectral line shape per channel on the basis of the optical power of each of the wavelengths, which power is detected by each of the light receiving elements (S6).

The determining unit 32 determines based on the spectral line shape of the light of each channel whether the signal light is the ASE light or not (S7). The signal light is, as illustrated in FIG. 13, narrow in spectral width and highly acute in peak, while the ASE light is, as illustrated in FIG. 14, large in spectral width depending on a transmission bandwidth of a filter device and is lower in peak than that of the signal light.

Such being the case, the determining unit 32 registers the data as reference data of the signal light and the ASE light in a database, and determines the signal light or the ASE light by checking whether the reference data is matched with the approximated spectral line shape or not and checking whether the approximated spectral line shape satisfies a predetermined condition or not.

Figure 13:
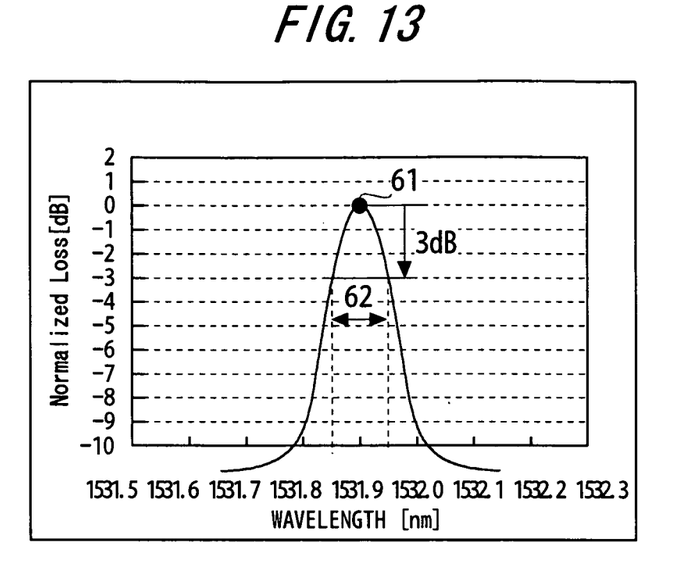
FIG. 13 is a diagram showing the spectral line shape of the signal light.
Figure 14:
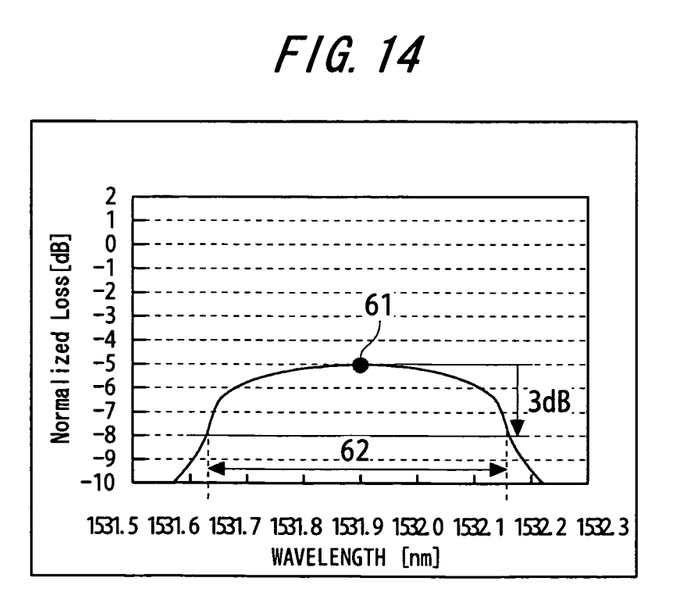
FIG. 14 is a diagram showing a spectral line shape of ASE light.

For example, in the case of 10G, as illustrated in FIGS. 13 and 14, if a wavelength width ranging from a peak 61 of the approximated spectral line shape down to a point decreased by 3 dB from the peak 61 is equal to or larger than 0.3 nm, the light is determined to be the ASE light, and, if less than 0.3 nm, the light is determined to be the signal light.

Figure 12:
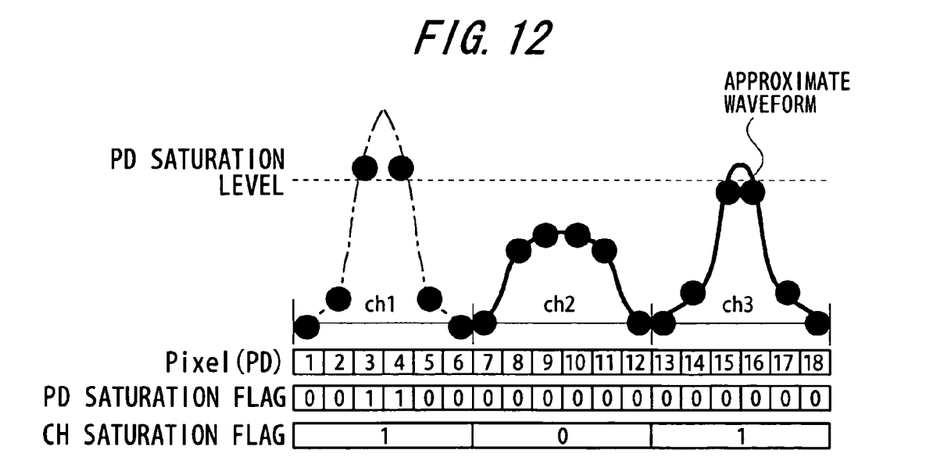
FIG. 12 is an explanatory diagram showing the saturation determination.

Accordingly, in FIG. 12, the light of ch2 is determined to be the ASE light, and the light of ch3 is determined to be the signal light.

When determined to be the ASE light, the adjusting unit 33 shuts down the transfer of the ASE light by controlling the VOA of the channel concerned (S8).

Further, when determined to be the signal light, the determining unit 32 calculates a peak value of the approximated spectral line shape (S9), and determines whether the relevant channel reaches the saturation level or not (S10).

The channel ch3 does not reach the saturation level on a light receiving element basis but reaches the saturation level on a channel basis. In this case, the determining unit 32 sets up the ch saturation flag at the channel (S11). The adjusting unit 33 attenuates the signal light by controlling the VOA in order to set the channel, at which the ch saturation flag has been set up, at the target level (S5).

On the other hand, it is determined in step 10 that the channel does not reach the saturation level, the control unit 3 is notified of the power level (S12), and the adjusting unit 33 controls the VOA corresponding to this power level and adjusts the signal light of the channel to the target level by attenuating the signal light (S5).

As described above, according to the first embodiment, when the power of the optical signal gets larger than normal and when reaching the saturation level of the light receiving element, the optical signal can be prevented from being mistakenly recognized as an optical noise due to the saturation of the light receiving element by the setting to the signal light without performing the approximate calculation.

Second Embodiment

Figure 15:
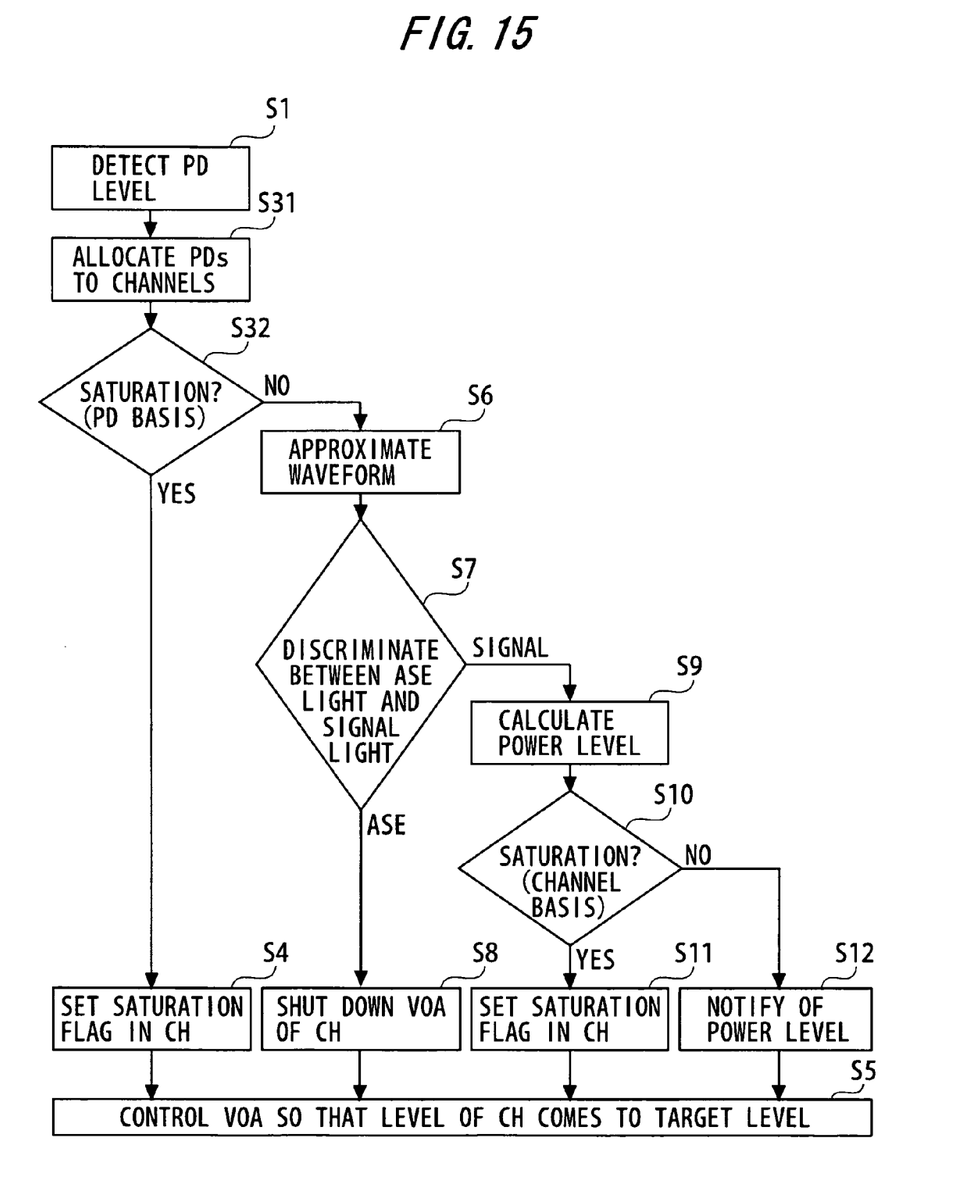
FIG. 15 is an explanatory diagram of a control method.

FIG. 15 is a diagram showing a control method according to a second embodiment. A different point of the second embodiment from the first embodiment discussed above is that the saturation determination is made in the way of excluding detected results of the light receiving elements located in the vicinity of boundaries of channels different from those in the first embodiment discussed above, and other configurations are the same. Therefore, the same components are marked with the same symbols and numerals, and their repetitive explanations are omitted.

Figure 16:
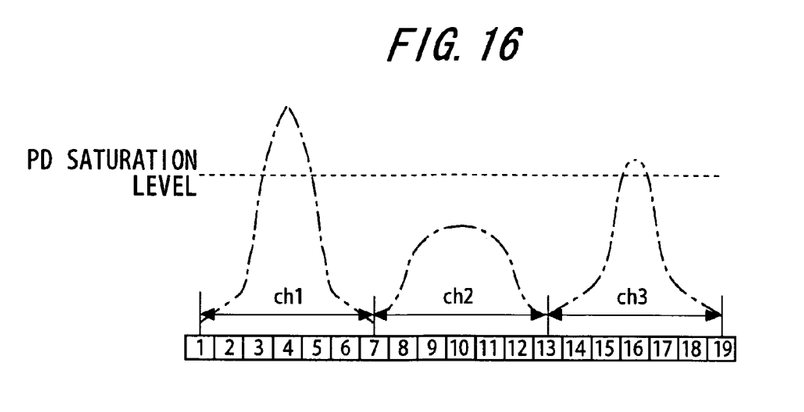
FIG. 16 is a diagram showing an example in which the light receiving element exists at a boundary between the neighboring channels.

An actual channel monitor is hard to exactly allocate the light receiving elements to the individual channels, and, for instance, there is a case in which some light receiving elements such as a pixel 7 and a pixel 13 in FIG. 16 exist at boundaries between the neighboring channels.

Moreover, it is also presumed that the wavelength of each channel deviates from ITU-Grid to some extent.

Therefore, if the light receiving element gets saturated in the vicinity of the boundary between the channels, it is impossible to uniquely determine which channel includes the saturated light receiving element.

Such being the case, the determining unit 32 makes the saturation determination in a way that excludes the detected results of the light receiving elements corresponding to the wavelengths in the predetermined areas defined as the boundaries between the channels.

Figure 17:
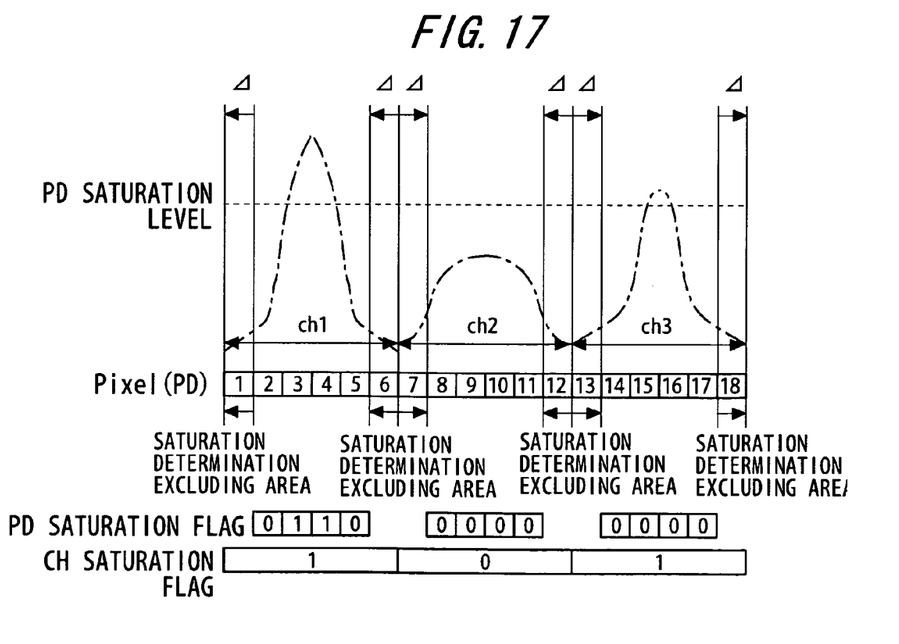
FIG. 17 is an explanatory diagram of a saturation determination excluding area.

For example, as illustrated in FIG. 17, in the actual equipment, a maximum value Δ of the wavelength, which deviates from the IT-Grid, is prescribed, and hence an area ranging from the boundary between the channels up to the maximum value Δ may also be set as the predetermined area.

Then, in the same way as described above, the respective light receiving elements of the light receiving element array 32A detect the optical power of the demultiplexed light (S1), and the individual light receiving elements are allocated to the channels (S31).

The determining unit 32 excludes the detected results of the light receiving elements existing in the vicinities of the boundaries (existing within the predetermined areas) between the channels from the detected results of the light receiving elements allocated to the individual channels, and determines whether the light receiving element reaches the saturation level or not (S32).

The operation proceeds to step 4 when there exists the light receiving element reaching the saturation level and to step 6 for the channel that includes none of the light receiving element reaching the saturation level, and the subsequent procedures are the same as described above.

Thus, according to the second embodiment, even when the light receiving elements existing in the vicinities of the boundaries between the wavelengths can not be allocated to the individual channels, the optical signal can be prevented from being mistakenly recognized as the optical noise.

<Others>

The present invention is not limited to only the illustrative examples described above and can be, as a matter of course, modified in many forms within the scope that does not deviate from the gist of the present invention.

What is claimed is:

1. A control device of a node that transfers signal light, the control device comprising:
   a monitor that monitors a channel of an inputted WDM signal; and
   a controller:
   configured to determine whether power of the inputted channel reaches a saturation level of the monitor, the controller further configured to determine whether the inputted channel is signal light or ASE light based on a spectral line shape in the case the power is determined to not reach the saturation level,
   the controller further configured to stop transfer of the ASE light in the case the controller determines the inputted channel is the ASE light,
   the controller further configured to adjust the inputted channel to a predetermined level of power in the case the controller determines the power of the inputted channel reaches the saturation level of the monitor and in the case the controller determines the inputted channel is the signal light.

2. The control device according to claim 1, wherein the monitor includes:
   a light receiving element array having a plurality of light receiving elements; and
   a demultiplexer to demultiplex the inputted channel according to wavelengths and to lead the demultiplexed channel to the light receiving elements corresponding to the wavelengths.

3. The control device according to claim 2, wherein in the case the inputted channel is composed of a plurality of channels having different wavelengths, the controller determines whether the inputted channel is the signal light or the ASE light in a way that excludes detected results of the light receiving elements corresponding to predetermined wavelengths that are embraced by boundaries between the different channels.

4. A control method executed by a control device of a node that transfers signal light, the control method comprising:
   monitoring a channel of an inputted WDM signal;

determining whether power of the inputted channel reaches a saturation level of the monitoring;

determining whether the inputted channel is signal light or ASE light based on a spectral line shape in the case the power is determined to not reach the saturation level, stopping transfer of the ASE light in the case the determining the inputted channel is the ASE light; and adjusting the inputted channel to a predetermined level of power in the case the determining the power of the inputted channel reaches the saturation level of the monitoring and in the case the determining the inputted channel is the signal light.

5. The control method according to claim 4, wherein the monitoring includes:

demultiplexing the inputted channel according to wavelengths; and leading the demultiplexed channel to a plurality of light receiving elements corresponding to the wavelengths.

6. The control method according to claim 5, wherein in the case the inputted channel is composed of a plurality of channels having different wavelengths, the determining determines whether the inputted channel is the signal light or the ASE light in a way that excludes detected results of the light receiving elements corresponding to predetermined wavelengths that are embraced by boundaries between the different channels.

7. A node comprising:

a transfer unit that transfers signal light via a network; and a control device that controls transfer of the signal light by the transfer unit, the control device including:

a monitor that monitors a channel of an inputted WDM signal; and a controller:

configured to determine whether power of the inputted channel reaches a saturation level of the monitor, the controller further configured to determine whether the inputted channel is signal light or ASE light based on a spectral line shape in the case the power is determined to not reach the saturation level, the controller further configured to stop transfer of the ASE light in the case the controller determines the inputted channel is the ASE light, the controller further configured to adjust the inputted channel to a predetermined level of power in the case the controller determines the power of the inputted channel reaches the saturation level of the monitor and in the case the controller determines the inputted channel is the signal light.

\* \* \* \* \*

UNITED STATES PATENT AND TRADEMARK OFFICE
CERTIFICATE OF CORRECTION

PATENT NO.       : 8,867,922 B2
APPLICATION NO.  : 12/149101
DATED            : October 21, 2014
INVENTOR(S)      : Ichiro Nakajima It is certified that error appears in the above-identified patent and that said Letters Patent is hereby corrected as shown below:

In the Claims

Column 8, line 33, in Claim 1, delete "controller:" and insert -- controller --, therefor.
Column 10, line 8, in Claim 7, delete "controller:" and insert -- controller --, therefor.

Signed and Sealed this
Nineteenth Day of May, 2015

Michelle K. Lee
*Director of the United States Patent and Trademark Office*